(12) United States Patent
Salem et al.

(10) Patent No.: US 10,237,745 B2
(45) Date of Patent: Mar. 19, 2019

(54) METHODS FOR SYNCHRONOUS ACCESS OF UNLICENSED MEDIUM BY GROUPING SMALL CELLS IN LICENSED ASSISTED ACCESS (LAA) NETWORKS

(71) Applicants: Mohamed Adel Salem, Ottawa (CA); Amine Maaref, Ottawa (CA)

(72) Inventors: Mohamed Adel Salem, Ottawa (CA); Amine Maaref, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 170 days.

(21) Appl. No.: 14/869,617

(22) Filed: Sep. 29, 2015

(65) Prior Publication Data

US 2017/0094584 A1 Mar. 30, 2017

(51) Int. Cl.
*H04W 16/14* (2009.01)
*H04W 48/18* (2009.01)
*H04W 16/10* (2009.01)

(52) U.S. Cl.
CPC ........... *H04W 16/14* (2013.01); *H04W 48/18* (2013.01); *H04W 16/10* (2013.01)

(58) Field of Classification Search
CPC ..... H04W 48/08; H04W 48/06; H04W 16/14; H04W 84/12
See application file for complete search history.

(56) References Cited

U.S. PATENT DOCUMENTS 9,253,686 B1 * 2/2016 Chaand ................. H04W 28/16
2010/0273468 A1 * 10/2010 Bienas .................. H04W 24/02
455/418

2014/0045513 A1 * 2/2014 Lim ....................... H04W 28/18
455/452.2
2015/0098349 A1 4/2015 Wei et al.
2015/0195849 A1 7/2015 Bashar et al.
(Continued)

FOREIGN PATENT DOCUMENTS

EP 3185633 A1 6/2017
WO 2015116791 A1 8/2015
(Continued)

OTHER PUBLICATIONS

Bhorkar, A. et. al., "Performance Analysis of LTE and Wi-Fi in Unlicensed Band Using Stochastic Geometry," IEEE 25th International Symposium on Personal, Indoor and Mobile Radio Communications, Sep. 2014, pp. 1310-1314.
(Continued)

*Primary Examiner* — Alex Skripnikov
*Assistant Examiner* — Sharmin Chowdhury

(57) ABSTRACT

Methods and systems for managing access of a communication resource in a licensed assisted access (LAA) network. Each transmission point (TP) of a plurality of TPs provides a first set of information indicative of expected usage of a first communication resource by each TP. Information is transmitted to the TPs to cause each TP to align usage or reservation of the first communication resource with any other TP belonging to a first radio access cluster (RAC) to which the given TP belongs, the first RAC being one in a first set of one or more RACs, wherein each of the plurality of TPs belongs to a respective RAC in the first set of RACs and each RAC in the first set of RACs contains one or more TPs.

22 Claims, 14 Drawing Sheets

(56) References Cited

U.S. PATENT DOCUMENTS

| | | | |
|---|---|---|---|
| 2015/0245376 A1 | 8/2015 | Bashar et al. | |
| 2016/0044548 A1* | 2/2016 | Choi | H04W 36/04 370/331 |
| 2016/0227578 A1* | 8/2016 | Lee | H04W 74/004 |
| 2017/0034831 A1* | 2/2017 | Yerramalli | H04W 72/08 |
| 2018/0249469 A1* | 8/2018 | Park | H04W 72/04 |

FOREIGN PATENT DOCUMENTS

| | | |
|---|---|---|
| WO | 2015126563 A1 | 8/2015 |
| WO | 2015131686 A1 | 9/2015 |

OTHER PUBLICATIONS

Qualcomm Technologies, Inc., "LTE in Unlicensed Spectrum: Harmonious Coexistence with Wi-Fi", Qualcomm Research, Jun. 2014.
Huawei, et al., "WF on frequency reuse for LAA" R1-151172, Huawei, HiSilicon, Sharp, Vodafone, Qualcomm, 3GPP TSG RAN WG1 Ad-Hoc Meeting, Paris, France, Mar. 24-26, 2015.
Discussion on the Scope of Carrier Aggregation and Small Cell Enhancements in Rel-13 3GPP TSG RAN Meeting #66 RP-141915. Huawei. Nov. 12, 2014.

\* cited by examiner

METHODS FOR SYNCHRONOUS ACCESS OF UNLICENSED MEDIUM BY GROUPING SMALL CELLS IN LICENSED ASSISTED ACCESS (LAA) NETWORKS

FIELD

The present disclosure relates to methods and devices for accessing unlicensed medium in licensed assisted access (LAA) networks.

BACKGROUND

There is ongoing interest in increasing the use of unlicensed spectrum. There is interest in aggregating unlicensed spectrum to licensed spectrum, in order to increase resources of a network when needed. Licensed assisted access (LAA) allows access to unlicensed spectrum, with assistance from a licensed network. LAA aims to port the Mobile Broadband (MBB) air interface to the unlicensed spectrum through aggregating unlicensed component carriers (CCs) at the operator's small cells. Although 5 GHz and 2.4 GHz are the current spectra of interest, LAA methods may be extendible to any other spectra.

A consideration in LAA is how to maintain efficient and fair coexistence with WLAN. Small cells (also referred to as low power nodes (LPNs)) are low-powered radio access nodes that may operate in both the licensed and unlicensed spectrum, and have a relatively short range (e.g., about 10 m to about 200 m), and can take advantage of LAA. A problem is that there may be a high density of small cell deployment for LAA as well as a high density of WLAN points, so interference may be expected to be significant. Further, WLAN typically is configured to opportunistically use more channels (e.g., per IEEE 802.11ac).

SUMMARY

In some examples, the present disclosure describes a method for managing access of a communication resource in a licensed assisted access (LAA) network, the method comprising: receiving, from a plurality of transmission points (TPs), a first set of information indicative of expected usage of a first communication resource by each TP; and in accordance with the first set of information, transmitting information to the plurality of TPs to cause each given TP to align usage or reservation of the first communication resource with any other TP belonging to a first radio access cluster (RAC) to which the given TP belongs, the first RAC being one in a first set of one or more RACs, wherein each of the plurality of TPs belongs to a respective RAC in the first set of RACs and each RAC in the first set of RACs contains one or more TPs.

In some examples, the present disclosure describes a system for managing access of a communication resource in a licensed assisted access (LAA) network, the system comprising a processor configured to execute instructions that cause the system to: receive, from a plurality of transmission points (TPs) associated with the system, a first set of information indicative of expected usage of a first communication resource by each TP; and in accordance with the first set of information, transmit information to the plurality of TPs to cause each given TP to align usage or reservation of the first communication resource with any other TP belonging to a first radio access cluster (RAC) to which the given TP belongs, the first RAC being one in a first set of one or more RACs, wherein each of the plurality of TPs belongs to a respective RAC in the first set of RACs and each RAC in the first set of RACs contains one or more TPs.

In some examples, the present disclosure describes a method, by a transmission point (TP), for accessing a communication resource in a licensed assisted access (LAA) network, the method comprising: transmitting, to a central server, a first set of information indicative of expected usage of a first communication resource by the TP; receiving information from the central server about a radio access cluster (RAC) to which the TP belongs, the information including timing information for accessing the first communication resource; and accessing or reserving the first communication resource in accordance with the timing information.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

A challenge in implementing LAA may be how to: maximize airtime share; enable high spectral efficiency transmission; while minimizing coexistence overhead. It may be preferable for LPNs that are in vicinity of each other to have synchronized transmission windows, per 3GPP standards, which may help to achieve a reuse factor of 1 and to simplify intra-operator interference management.

Approaches include each transmission point (TP) independently accessing the unlicensed spectrum. In this approach, also referred to as Listen-Before-Talk (LBT), each TP accesses the medium whenever the medium is determined (e.g., using energy detection) to be available. The TP may access the medium without reserving the medium, with the result that a WLAN node may not be aware of the usage by the TP and may transmit during the TP transmission, causing interference.

Figure 1A:
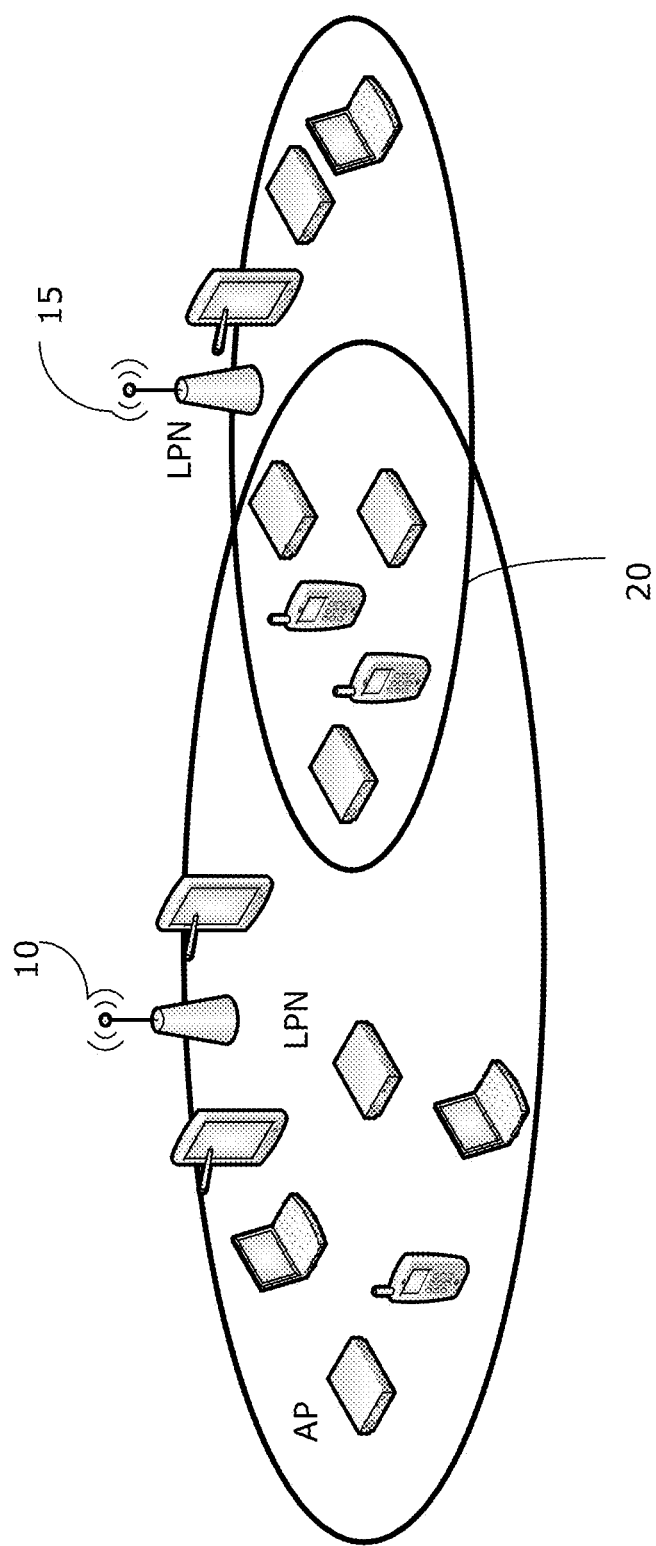
FIG. 1A is a diagram illustrating example overlapping WLAN footprints of LPNs.
Figure 1B:
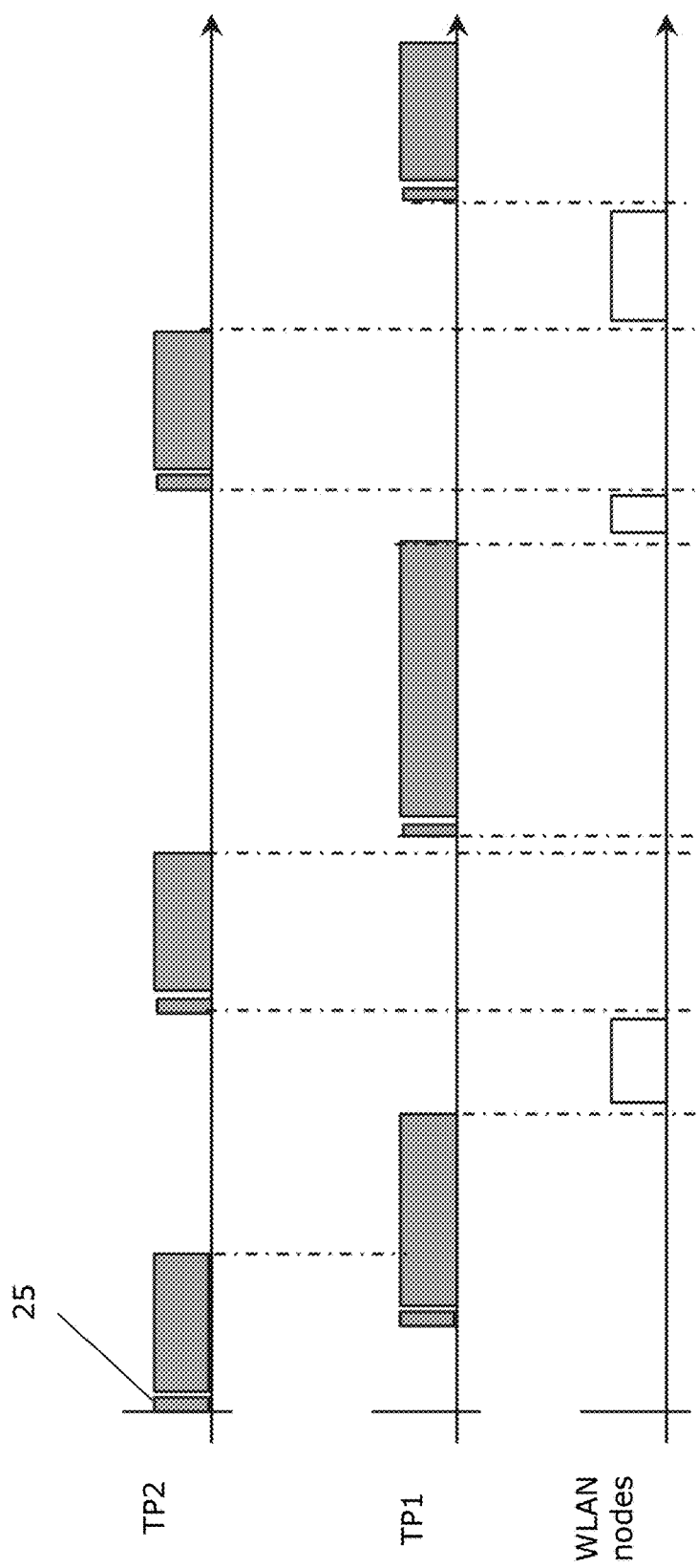
FIG. 1B is a diagram illustrating asynchronous use of a communication medium by the LPNs of FIG. 1A.

Alternatively, the TP may reserve the transmission period (e.g., blocking WLAN nodes by invoking carrier sensing (CS)), with the result that TP transmissions are not at risk of WLAN interference. However, this may excessively block usage by WLAN nodes. FIGS. 1A and 1B illustrate a problem with this access method. In FIG. 1A, two LPNs, namely TP1 10 and TP2 15 each provide spectrum access for one or more devices. TP1 10 and TP2 15 have overlapping footprints, such that WLAN nodes 20 fall in the overlapping area. FIG. 1B shows an example of medium usage by each of TP1 10, TP2 15 and the common WLAN nodes 20. In FIG. 1B, each transmission from each TP 10, 15 is preceded by a signal 25 to reserve that block of transmission time and block usage by the WLAN nodes 20. Since usage by the TPs 10, 15 is not synchronized, there is significant blockage against WLAN usage. This blockage may be even worse if the TPs 10, 15 attempt to coordinate with each other to avoid interference between TPs 10, 15. The result is that coexistence fairness may be compromised due to some WLAN nodes, falling into an area of overlap between TP footprints, being multiply blocked by overlapping TPs. This situation may be aggravated if there is a high density of nodes and high channel occupancy.

Another approach may be for LAA TPs to coordinate usage with neighboring TPs, by avoiding interference with other TP transmissions. In this approach, a usage share (also referred to as a duty cycle) of the unlicensed medium that is considered to be "fair" is estimated. Usage by the TPs may then be permitted for defined periods of time. During the defined periods, each TP may transmit directly (without using LBT), with each TP coordinating with neighboring TPs to avoid simultaneous transmission. The result is that the WLAN nodes will always have a protected period of usage that cannot be blocked by TPs, however WLAN usage may not be restricted to specific time periods. Thus, it is possible that WLAN transmissions will occur during periods that have been defined for TP use. Furthermore, the desired frequency reuse is not achieved.

In various examples, the present disclosure provides methods and devices that may help to address one or more concerns of existing approaches. In some examples described here, an LBT approach may be used to enable synchronization. Further, one or more TPs may be grouped together in a radio access cluster (RAC), to increase efficiency of medium usage.

Figure 2:
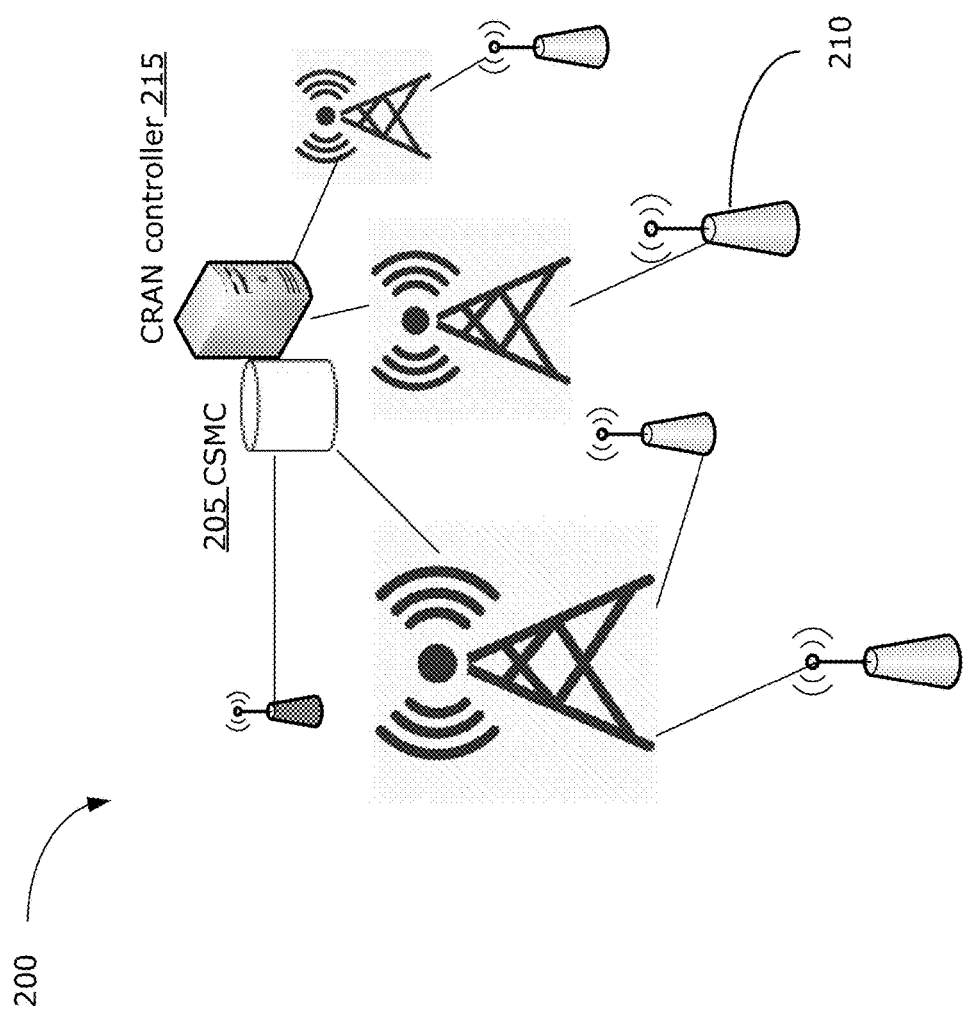
FIG. 2 is a diagram of an example system in which examples disclosed herein may be implemented.

FIG. 2 illustrates an example system 200 in which examples described herein may be implemented. In the example system 200, a central spectrum management control unit (CSMC) 205 manages operation of a plurality of TPs 210. The system 200 may include a cloud radio access network (CRAN) and the CSMC 205 may be implemented by a CRAN controller 215. The CSMC 205 may manage usage of unlicensed medium by the managed TPs 210, for one or more channels of the medium (generally referred to as one or more communication resources). The CSMC 205 may manage the TPs 210 via one or more backhaul connections (or eNodeB interfaces). Generally, information exchange over backhaul connections may be acceptable where the exchange does not need to be rapid (e.g., only needs to be comparable to the length of a frame or duty cycle period of the medium, such as 10-1000 ms).

Figure 3:
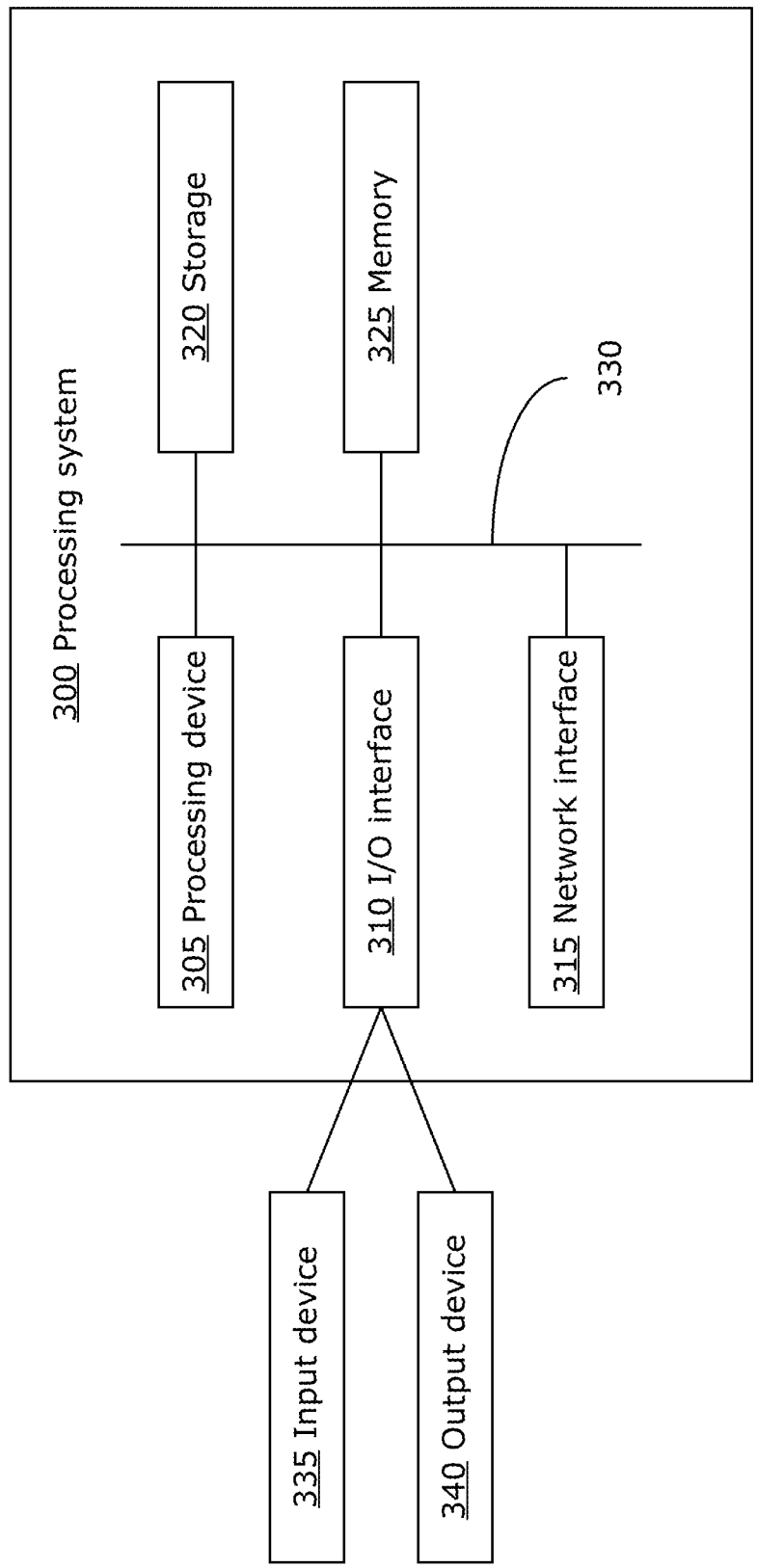
FIG. 3 is a diagram of an example processing system in which examples disclosed herein may be implemented.

FIG. 3 is a schematic diagram of an example processing system 300, which may be used to implement the methods and systems disclosed herein, such as the example CSMC 205 and the example methods described below. The processing system 300 may be a server, for example, or any suitable processing system. Other processing systems suitable for implementing the present disclosure may be used, which may include components different from those discussed below. Although FIG. 3 shows a single instance of each component, there may be multiple instances of each component in the processing system 300.

The processing system 300 may include one or more processing devices 305, such as a processor, a microprocessor, an application-specific integrated circuit (ASIC), a field-programmable gate array (FPGA), a dedicated logic circuitry, or combinations thereof. The processing system 300 may also include one or more input/output (I/O) interfaces 310, which may enable interfacing with one or more appropriate input devices 335 and/or output devices 340. The processing system 300 may include one or more network interfaces 315 for wired or wireless communication with a network (e.g., an intranet, the Internet, a P2P network, a WAN and/or a LAN). The network interface(s) 315 may include wired links (e.g., Ethernet cable) and/or wireless links (e.g., one or more antennas) for intra-network and/or inter-network communications. The network interface(s) 315 may provide wireless communication via one or more transmitters or transmit antennas and one or more receivers or receive antennas, for example. The processing system 300 may also include one or more storage units 320, which may include a mass storage unit such as a solid state drive, a hard disk drive, a magnetic disk drive and/or an optical disk drive.

The processing system 300 may include one or more memories 325, which may include a volatile or non-volatile memory (e.g., a flash memory, a random access memory (RAM), and/or a read-only memory (ROM)). The non-transitory memory(ies) 325 may store instructions for execution by the processing device(s) 305, such as to carry out examples described herein. The memory(ies) 325 may include other software instructions, such as for implementing an operating system and other applications/functions. In some examples, one or more data sets and/or module(s) may be provided by an external memory (e.g., an external drive in wired or wireless communication with the processing system 300) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 330 providing communication among components of the processing system 300, including the processing device(s) 305, I/O interface(s) 310, network interface(s) 315, storage unit(s) 320 and/or memory(ies) 325. The bus 330 may be any suitable bus architecture including, for example, a memory bus, a peripheral bus or a video bus.

In FIG. 3, the input device(s) 335 (e.g., a keyboard, a mouse, a microphone, a touchscreen, and/or a keypad) and output device(s) 340 (e.g., a display, a speaker and/or a printer) are shown as external to the processing system 300. In other examples, one or more of the input device(s) 335 and/or the output device(s) 340 may be included as a component of the processing system 300.

Figure 4:
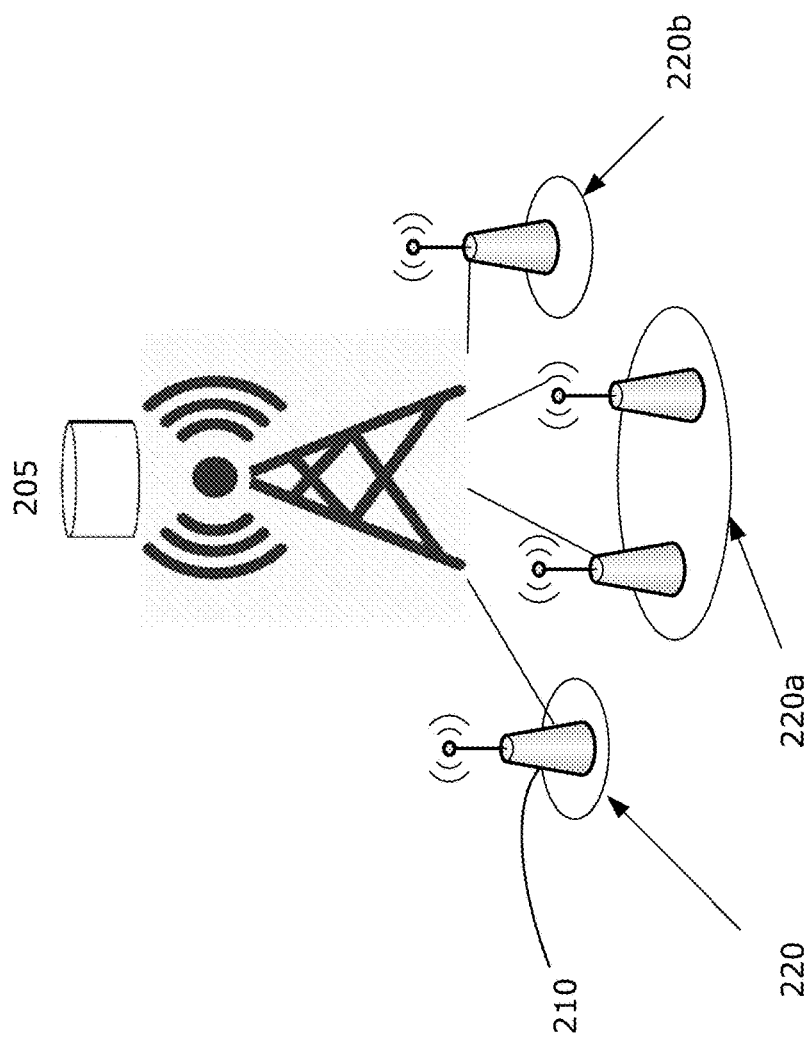
FIG. 4 is a diagram of an example system illustrating a example embodiment of the disclosed examples.

Reference is now made to FIG. 4. In an example of the disclosed methods and systems, the CSMC 205 may define one or more RACs 220 for the managed TPs 210. The defined RACs 220 may be channel-specific—that is, different RACs 220 may be defined for different channels of the unlicensed medium. In a given channel, each TP 210 belongs to one RAC 220 and each RAC 220 may contain one or more TPs 210. In the example shown, RAC 220a contains two TPs 210 while RAC 220b contains one TP 210. The CSMC 205 may group TPs 210 into a single RAC 220 in order to optimize usage of the medium, as discussed further below. It should be noted that although the term "optimize" is used throughout this disclosure, the result of optimization may not be strictly optimal. For example, optimization may be performed only to optimize a specified parameter (possibly at the expense of other parameters) and/or may be performed as an approximation that may not necessarily obtain the true optimal result.

Generally, each TP 210 may be aware of its own channel usage as well as channel utilization by neighboring WLAN nodes. For example, a TP 210 may listen to the medium to estimate long term (e.g., in the range of 10 ms to about 1000 ms) usage of the medium by neighboring WLAN nodes. In this way, a TP 210 may determine the number of potentially affected WLAN nodes and thus its area of influence (or "footprint") when the TP 210 transmits over the medium. This determination of footprint may be performed for each channel of the medium. Footprints for different TPs 210 may overlap, meaning that there may be WLAN nodes that would be multiply impacted by TP transmission. This may be especially true in situations of dense TP deployment and/or high channel occupancy.

Footprint information may be provided to the CSMC 205. The CSMC 205 may then opportunistically group TPs 210 into RACs 220 to align channel access usage and/or reservation, such that the TP(s) 210 within each RAC 220 have a common airtime share. This grouping and alignment may be performed for each upcoming frame. The CSMC 205 may provide RAC information to each TP 210 belonging to a given RAC. The RAC information for the given RAC may include, for example, a RAC identifier, identifier(s) of the TP(s) belonging to the given RAC, the total footprint of the given RAC, the WLAN load impacted by the given RAC and/or the load (e.g., user equipment (UE)) associated with the given RAC. Since a RAC 220 may be defined for a given channel, the RAC information may also be specific to the given channel. Details and criteria for grouping TPs 210 will be discussed further below.

Figure 5:
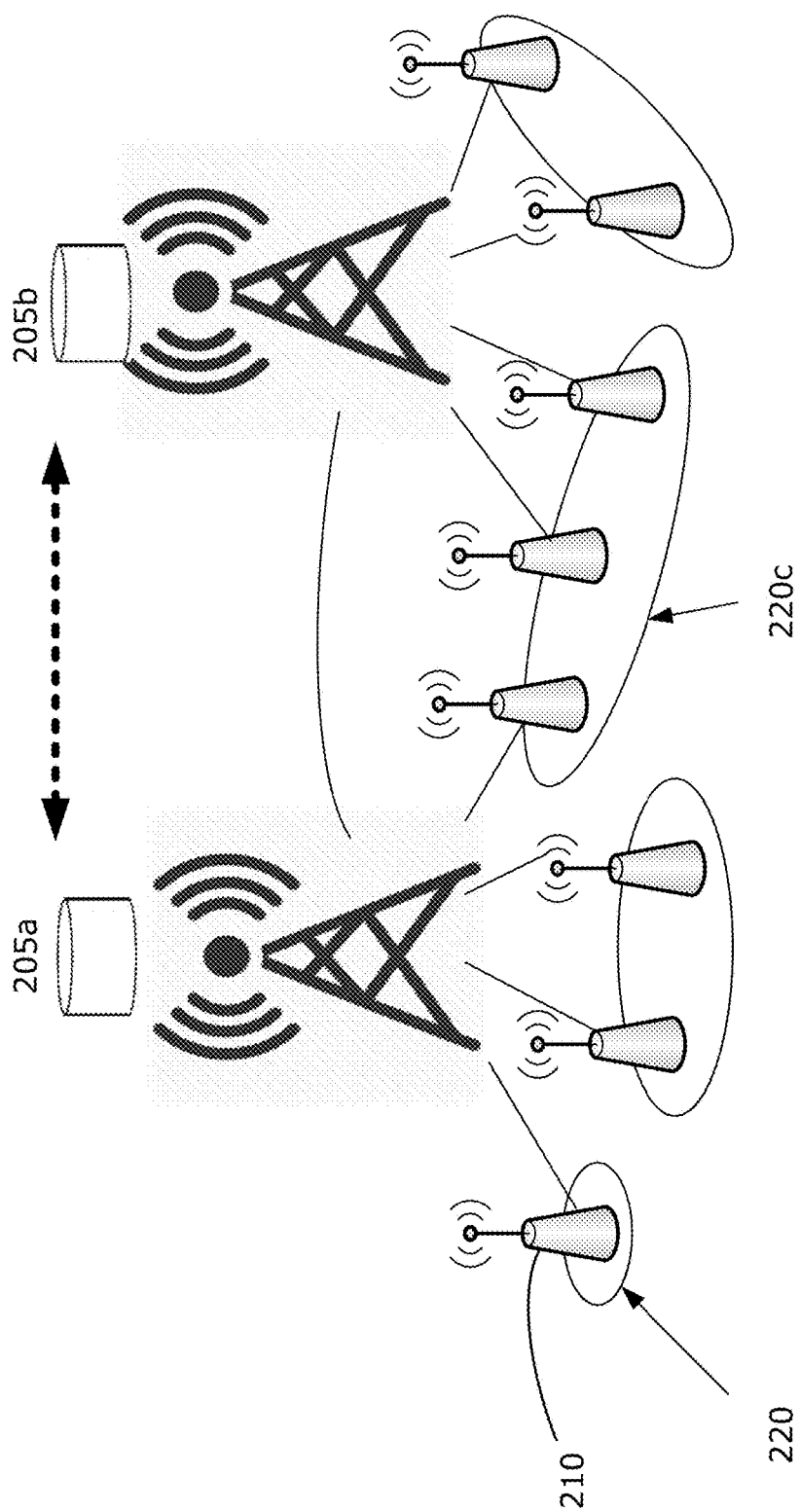
FIG. 5 is a diagram of an example system illustrating another example embodiment of the disclosed examples, involving multiple central servers.

FIG. 5 shows an example in which a RAC 220c may be defined between two or more CSMCs 205a, 205b, such that TPs 210 belonging to different CSMCs 205a, 205b may be grouped together into the same RAC 220c. The RAC 220c may be referred to as a cross-CSMC RAC 220c. Such a grouping may be possible where the CSMCs 205a, 205b share information about respective managed TPs 210. The shared information may include, for example, identifier(s) of TP(s) 210 managed by the different CSMCs 205a, 205b that are in vicinity of each other or that have overlapping footprints, as well as the footprints associated with the identified TP(s) 210.

Figure 6:
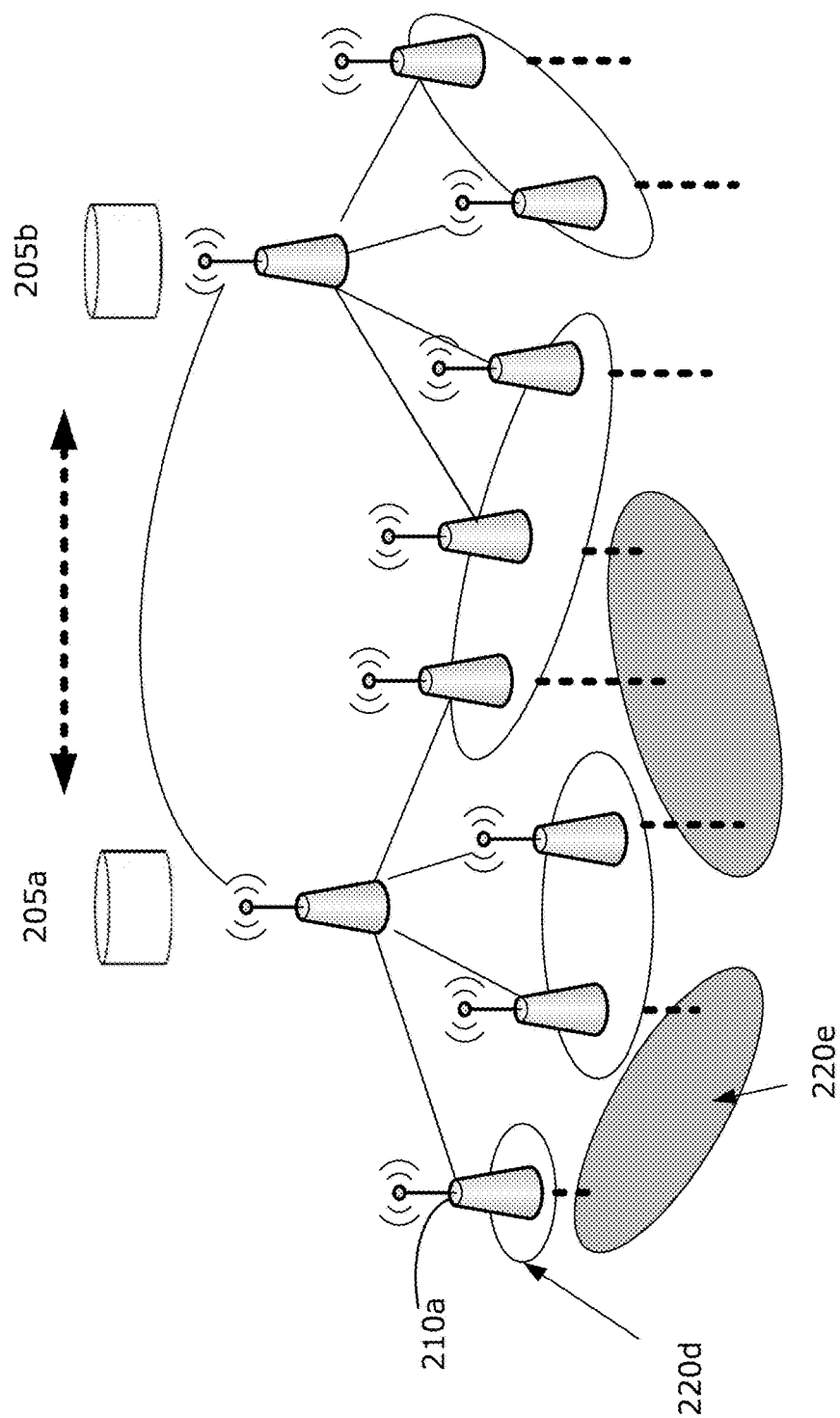
FIG. 6 is a diagram of an example system illustrating another example embodiment of the disclosed examples, involving multiple channels of a communication medium.

FIG. 6 shows an example in which different RACs 220 are defined for different channels of the unlicensed medium. In this example, a given TP 210a may be the only TP belonging to a RAC 220d defined for a first channel (also referred to as a first communication resource), but may be grouped with another TP in a different RAC 220e defined for a second channel (also referred to as a second communication resource).

Details and criteria for grouping TPs and defining RACs are now discussed. In some examples, the CSMC may define RACs for each channel of the medium, for each upcoming frame. The CSMC may opportunistically group TPs into RACs to align channel access usage and/or reservation, such that the TP(s) within each RAC have a common airtime share. Various criteria may be used for grouping decisions.

For example, a RAC may be defined based on whether a greater achievable Soft AirTime (SAT) share is estimated for the TP(s) merged into the RAC. SAT share defines the percentage usage of the medium for each RAC. The CSMC may determine whether is it appropriate to grow the RAC (i.e., including additional TPs into the RAC) by determining whether a greater SAT is achieved by growing the RAC. When properly defined (e.g., as discussed further below), a RAC may improve coexistence fairness and efficiency by aligning TP airtime use. Generally, implementation of RACs may: enable exploitation of the local nature of WLAN nodes, particularly in the case of dense deployments and/or increased channel occupancy; help to increase the fair SAT share of the TPs grouped in a RAC; help to improve coexistence fairness through implementation of estimated fair share; provide more effective protection from surrounding (hidden) WLAN nodes due to the merged footprints of the TPs in the RAC; help to address the problem of intra-LAA operator "exposed nodes"; help to achieve a reuse factor of 1; and/or help to simplify LAA interference measurement and management (e.g., enable implementation of Interference Mitigation and Traffic Adaptation (IMTA) techniques). By reuse factor 1, it is meant that two TPs may use the same medium resources (e.g., both TPs may access the whole available spectrum at the same time) instead of having to coordinate which TP accesses which resource at what time.

A problem with "hidden" WLAN nodes is that a WLAN node in the footprint of a first TP may not be known to a neighboring second TP. However, the WLAN node may still interfere with transmissions by the second TP if the WLAN node is close to the border of the footprint of the second TP. By grouping the first and second TPs together into a single RAC, information about the WLAN node from the first TP may be taken into account when managing transmissions from both the first and second TPs. In this way, the second TP may benefit from information determined by the first TP when both TPs are grouped into the same RAC. This may enable improved signal-to-noise ratio (SNR) due to better managing of WLAN interference.

The exposed node problem is that two neighboring TPs, while not interfering with each other, may nonetheless block each other's access of the medium if each independently accesses the medium using LBT. When the two TPs are grouped together in the same RAC, then the TPs may access the medium as one unit.

Grouping of TPs into RACs may be performed by the CSMC by considering the load or utilization of the merged footprint as compared to the total load or utilization of the TPs individually. Generally, the criterion for merging TPs into a RAC may be designed to favor merging footprints that coincide or nearly coincide with each other. This may enable fairer coexistence with WLAN nodes, while still serving the combined loads of the individual TPs. Generally, determination of a RAC may be an iterative process, with a RAC being grown as additional TPs (or other RACs) are merged into the RAC. Although a RAC may be grown by merging TPs one by one, more generally a RAC may be grown by merging a candidate (or visitor) RAC (which may be a single TP) with a host RAC.

The CSMC may determine the suitability of merging a visitor RAC with the host RAC by calculating the SATs of the host RAC before and after merging with the visitor RAC. An example equation calculating the estimated SAT (or duty cycle) is as follows:

$$\frac{RACLoad_{l,n}}{RACLoad_{l,n} + CoexAdj * FootprintLoad_{l,n}}$$

where l is the index of the RAC, n is the channel frequency, and CoexAdj is the coexistence fairness adjustor. CoexAdj may be set to be greater than 1 to emphasize the impacted WLAN load with respect to the RAC load; alternatively, this term may be set to be less than 1 to de-emphasize the impacted WLAN load with respect to the RAC load. $RACLoad_{l,n}$ is the UE load of the RAC with index l at frequency n, and $FootprintLoad_{l,n}$ is the WLAN load of the footprint of the RAC with index l at frequency n. Thus, a 50% SAT means that the RAC load occupies 50% of the channel usage time and the WLAN load occupies the other 50%.

Using this equation, the SAT of a possible merge may then be calculated as:

$$RAC\_target\_SAT_{merge,n} = \frac{RACLoad_{merge,n}}{RACLoad_{merge,n} + CoexAdj * FootprintLoad_{merge,n}}$$

where the RAC load and footprint load of the possible merge may be calculated as:

$$RACLoad_{merge,n} = RACLoad_{visitor,n} + RACLoad_{host,n}$$

$$FootprintLoad_{merge,n} = Load(Footprint_{visitor,n} \cup Footprint_{host,n})$$

Thus, if the footprint of the visitor RAC is coincident with or similar to the footprint of the host RAC, the WLAN load of the merged footprint may not increase much while the merged RAC load increases more. The result will be that the merged RAC has an improved SAT and the CSMC may determine that the visitor RAC should be merged with the host RAC. Conversely, if the footprints of the visitor RAC and the host RAC are not sufficiently overlapping, then the merged RAC may have a worse SAT and the CSMC may determine that the visitor RAC should not be merged with the host RAC.

Figure 7:
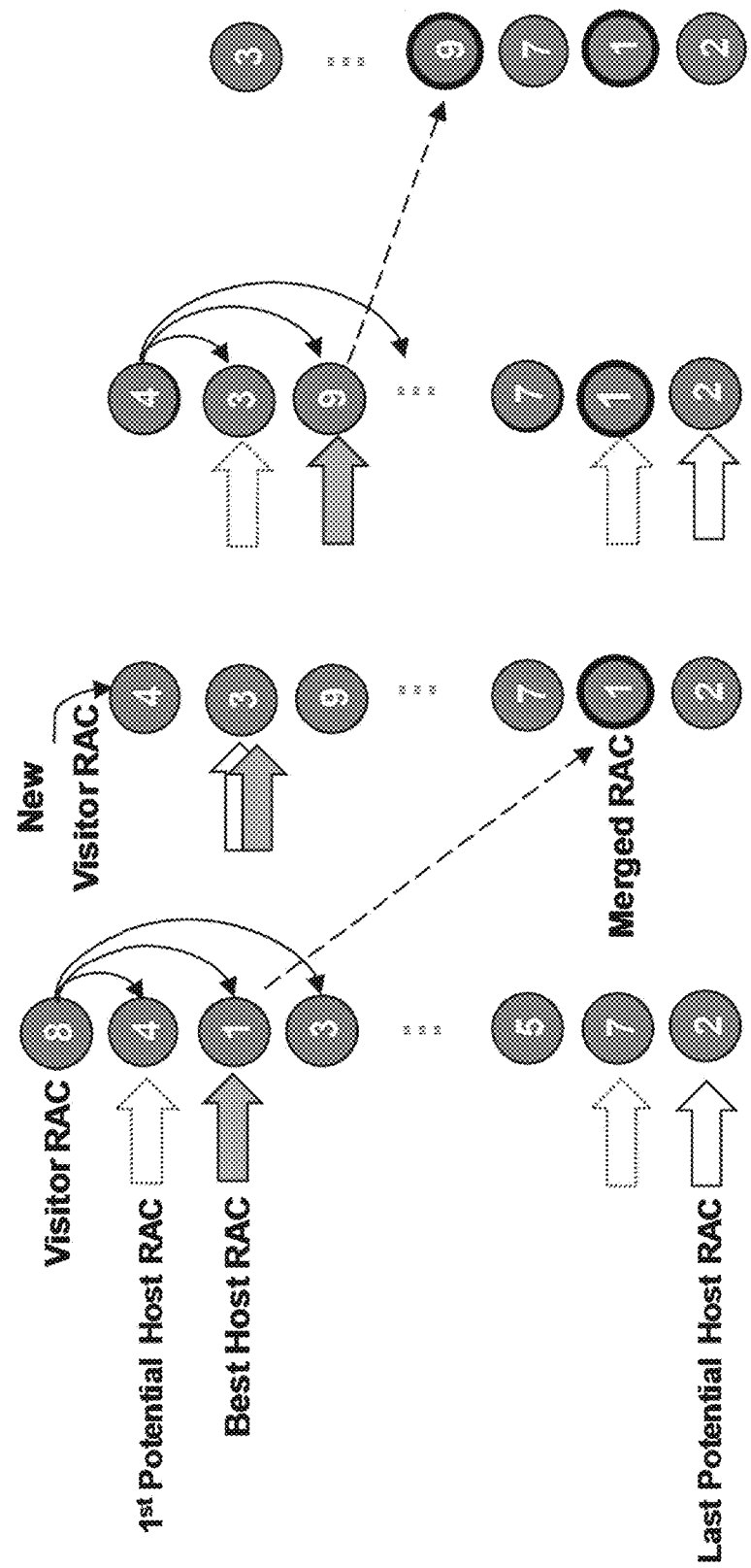
FIG. 7 illustrates an example of a grouping algorithm suitable for use in examples disclosed herein.

FIG. 7 illustrates an example in which the above calculations may be used to iteratively determine the proper RAC grouping. Generally, the CSMC may already have defined an initial set of RACs (e.g., defined for a previous frame, or defined by default—for example, the CSMC may, as a starting point, define each TP as belonging to its own RAC). In some examples, if RACs were previously defined, the CSMC may use the previously defined RACs as a starting point. Alternatively, the CSMC may dissolve all previously defined RACs and use default RAC definitions, such as defining each TP as belonging to its own RAC as the starting point. The CSMC may update its defined RACs periodically (e.g., ahead of an upcoming frame) or in response to a trigger (e.g., a change in UE association and/or channel selection, such as offloading of UE traffic onto unlicensed spectrum or handover of UE). In a CSMC handling a set of RACs on a given unlicensed channel n, a max-min iterative approach may be used such that the RAC with the lowest SAT value may be considered a visitor RAC. That is:

$$RAC\_target\_SAT_{host,n} \geq RAC\_target\_SAT_{visitor,n}$$

The CSMC may attempt to increase the SAT of the visitor RAC by merging the visitor RAC with a host RAC. The set of channel RACs may be first sorted in ascending order of their initial SATs. In FIG. 7, the RACs are illustrated as circles with increasing SAT from top to bottom. The visitor RAC is merged with potential host RACs in order from the potential host RAC with lowest SAT to the potential host RAC with highest SAT, and the resulting SAT of each potential merge is compared to determine the best merge as follows:

$$\frac{RAC\_target\_SAT_{merge,n}}{RAC\_target\_SAT_{host,n}} > \frac{RAC\_target\_SAT_{best\_merge,n}}{RAC\_target\_SAT_{best\_host,n}}$$

In the example of FIG. 7, it was found that RAC1 is the best host RAC for visitor RAC8, and the merge is performed. After the merge, the RACs are again ordered by their SAT value and the visitor RAC is again determined as the RAC with the lowest SAT. In this case, RAC4 becomes the new visitor RAC. Again, the best merge for the visitor RAC is determined, resulting in RAC4 being merged with RAC9. This process is iteratively repeated until no further SAT improvement is achieved by merging. Generally, SAT improvement may be expected where RACs with similar or significantly overlapping footprints are merged. The CSMC may carry out this process on a per-channel basis, and may recalculate the merging periodically (e.g., before every frame or every 100 ms) or in response to a trigger (e.g., a change in UE association and/or channel selection, such as offloading of UE traffic onto unlicensed spectrum or handover of UE).

The above discussion presents an example criterion for determining RAC groupings and example equations and methods for evaluating this criterion. However, other criteria may be used and/or other methods of evaluation SAT or other criteria.

Figure 8:
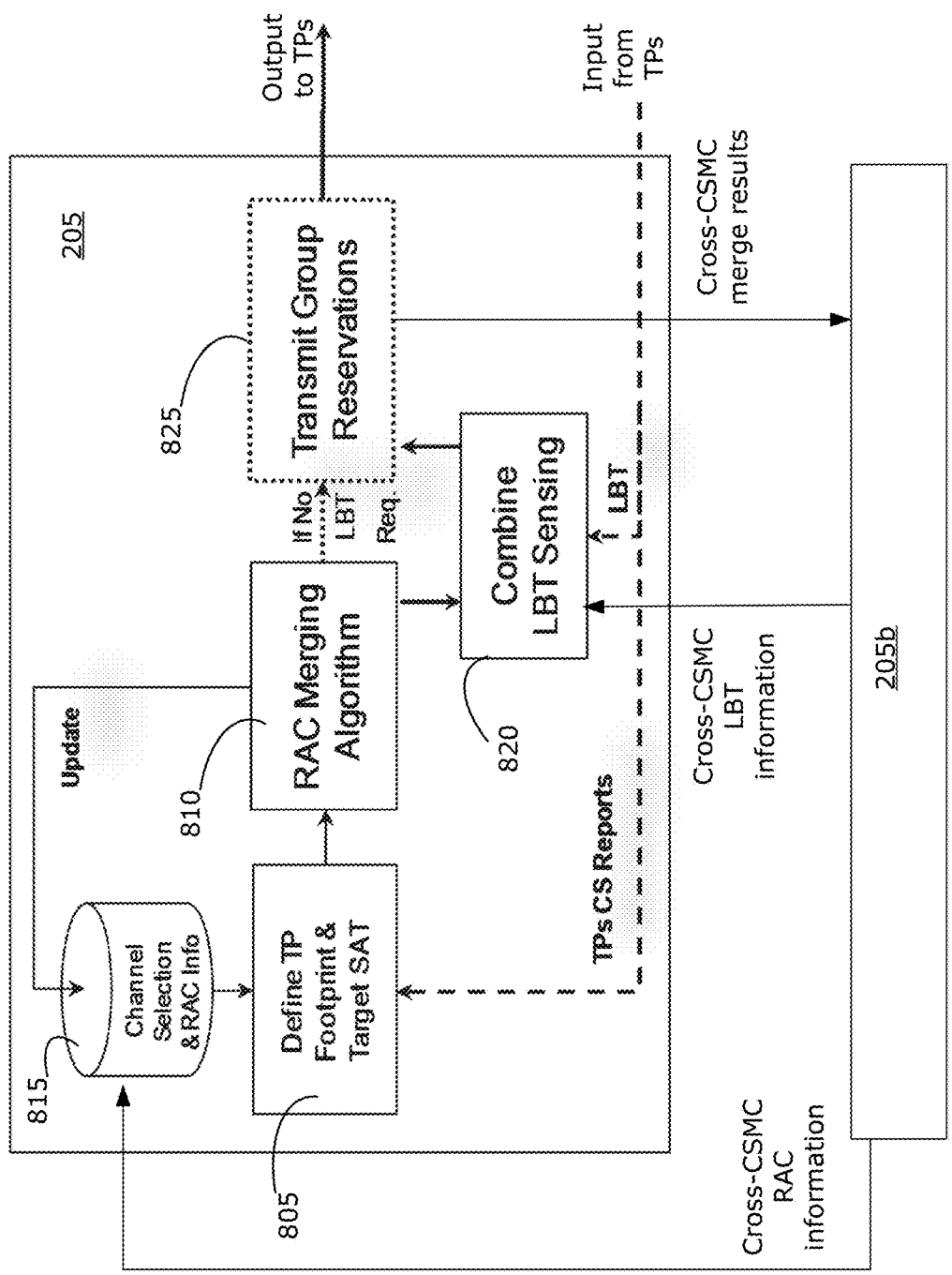
FIG. 8 is a diagram illustrating example logic for implementing examples disclosed herein.

FIG. 8 illustrates an example of the logic that may be implemented by the CSMC 205 in order to generate RACs. The example logic illustrated may be performed by a processor of the CSMC 205 (e.g., the processing device 305, where the CSMC 205 is implemented using the example processing system 300 of FIG. 3) that carries out instructions stored in a local or external memory (e.g., the memory 325 of FIG. 3). Data used in and/or generated by the example logic may be stored in local or external memory.

The CSMC 205 may receive information from associated TP(s) (not shown). This information may be specific to a particular channel of the communication medium. In some examples, the information from TP(s) may provide information about the available medium, channel selection, footprint of each TP and served load of each TP. For example, the received information may include CS reports and optionally LBT reports from individual TPs. CS reports may generally provide more long-term information (e.g., on the order of 10-1000 ms) while LBT reports may generally provide more instantaneous information that may be used to determine whether the medium is free to access. CS reports may contain information to enable the CSMC 205 to define the TP footprint (at 805). CS reports from individual TPs of a host RAC may be grouped together and used to define the footprint of the host RAC, and may be used to calculate the starting (or target) SAT of the host RAC. This information is used to perform RAC merging using an appropriate RAC merging algorithm (at 810), discussed further below. If the host RAC is changed (e.g., is merged with one or more visitor RACs), this information is updated to the channel selection and RAC information database (at 815), and a new footprint and SAT are determined for the updated RAC.

Optionally, if LBT is performed (e.g., if required by regulations), LBT reports from TPs belonging to the same RAC may be grouped together and used to determined whether the medium is free for the RAC to access as a group (at 820).

After evaluating the LBT reports, or directly after merging RACs if LBT is not used, the CSMC 205 generates RAC information (at 825), including information for group reservation (e.g., joint or sequential reservation) of the medium, and transmits this information to the associated TPs. The information transmitted to the TPs may cause the TPs belonging to a given RAC to jointly or sequentially align their usage of the medium (e.g., during a defined common duty cycle period), for example by reserving usage of the medium as a group (e.g., using WLAN-like signaling). Thus, the TPs of a RAC may be caused to align their usage and/or reservation of medium (e.g., a particular channel of the medium) with each other in a common duty cycle period.

In some examples, the CSMC 205 may be in a master-slave relationship with another CSMC 205*b*. For example, the CSMC 205 may act as the master and the other CSMC 205*b* may act as the slave. The slave CSMC 205*b* may be similar to the master CSMC 205 and may, with respect to its own associated TPs, implement logic similar to that shown in FIG. 8 for the master CSMC 205; however the slave CSMC 205 has been shown simplified for ease of understanding. The master CSMC 205 may use information received from the slave CSMC 205*b* (e.g., received via a backhaul connection or via interfaces between eNodeBs) to define one or more cross-CSMC RACs. Where one or more cross-CSMC RACs have been previously defined, the slave CSMC 205*b* may provide cross-CSMC RAC information to the master CSMC 205. Optionally, if LBT is used, the master CSMC 205 may also receive cross-CSMC LBT information from the slave CSMC 205*b*. The master CSMC 205 may use the information received from the slave CSMC 205*b*, together with information received from its own TPs, to perform RAC merging, as discussed above. The RAC information generated by the master CSMC 205 may include information for newly defined and/or updated cross-CSMC RAC(s), and the results of the cross-CSMC RAC(s) merging may be transmitted to the slave CSMC 205*b*, for transmission to the TPs associated with the slave CSMC 205*b*.

Figure 9:
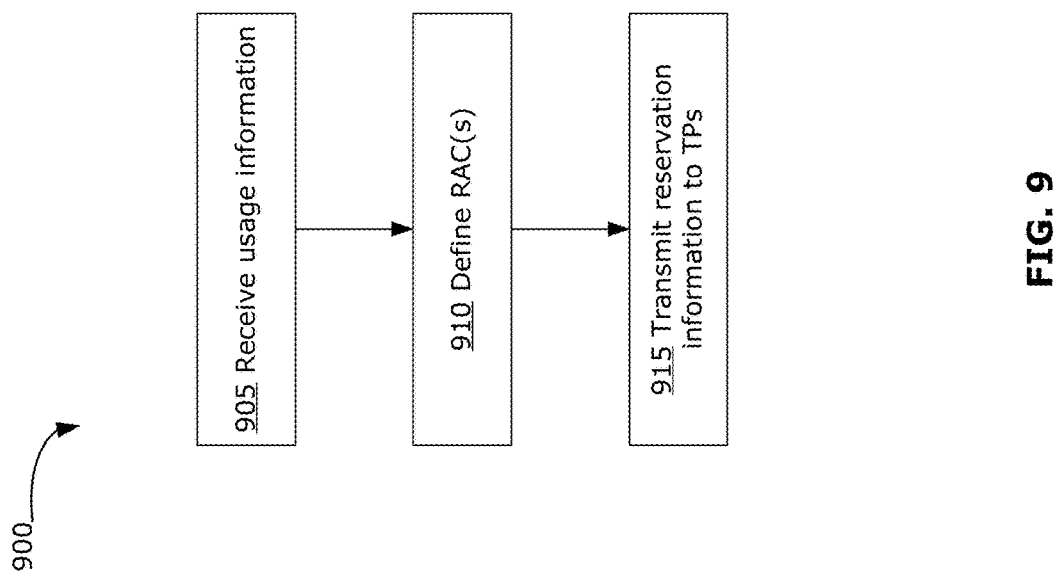
FIG. 9 is a flowchart illustrating an example of the disclosed methods.

FIG. 9 is a flowchart illustrating a method for managing access of a communication resource in a LAA network. The example method 900 may be performed by the CSMC managing a plurality of associated TPs.

At 905, the CSMC receives, from each associated TP, usage information (e.g., CS reports). This information may be indicative of expected usage (e.g., WLAN load and UE load) of a first communication resource (e.g., a channel of the unlicensed medium) by each TP.

At 910, using the received information, the CSMC may define one or more RACs for the first communication resource. Each TP belongs to a respective RAC and each RAC contains one or more TPs. Each RAC may be defined to optimize usage of the first communication resource by the TPs belonging to that RAC.

At 915, the CSMC may transmit reservation information to the TP(s) belonging to each RAC. This information may to cause the TP(s) belonging to a given RAC to align usage and/or reservation of the first communication resource with each other.

The example method 900 may be carried out concurrently or sequentially for other channels of the unlicensed medium.

In various examples, the disclosed methods and systems may provide advantages over conventional approaches for unlicensed medium access. For example, examples of the disclosed methods and systems may provide WLAN nodes with fairer coexistence; UEs served by TPs may experience less WLAN interference for longer airtime; and a reuse factor of 1 may be achieved. Grouping individual TPs into RACs of two or more TPs may also enable various techniques to be implemented for improved communications. For example, two or more TPs in the same RAC may transmit together to improve spectral efficiency, for example using an advanced Coordinated Multi-Point (CoMP) transmission scheme. In some examples, a given TP may have better transmission quality than other TPs belonging to the same RAC; that given TP may be dynamically selected (e.g., by the CSMC or by negotiation among the TPs belonging to the same RAC) for transmission on behalf of the entire RAC. In some examples, the traffic of one TP may be served by another TP belonging to the same RAC, thus enabling the first TP to switch off and save energy after sending out its reservation signal or preamble. In some examples, a macro cell base station, which may lack the sensing capability of small cells, may be merged into a RAC in its vicinity to benefit from the small cells' ability to sense WLAN activity, and enable the macro cell base station to access the medium as part of the RAC group. In such a case, the transmission power of the macro cell base station may be capped to meet the unlicensed band regulations. Other such techniques may be possible.

Consider the simple example of two TPs with respective associated loads and WLAN footprints. For simplicity, this example assumes that each served UE/node has the same load. In reality, different UEs/nodes may present different loads. In this example, TP1 has an associated UE load of 2 (i.e., serves two UEs) and a WLAN footprint load of 5 (i.e., five WLAN loads fall into the area of influence of TP1); TP2 has an associated UE load of 1 and a WLAN footprint load of 3. However, because the footprints of TP1 and TP2 overlap, there are two WLAN nodes that fall in the overlapping area—that is, of the five WLAN nodes within the footprint of TP1, two of those WLAN nodes are also within the footprint of TP2.

Figure 10:
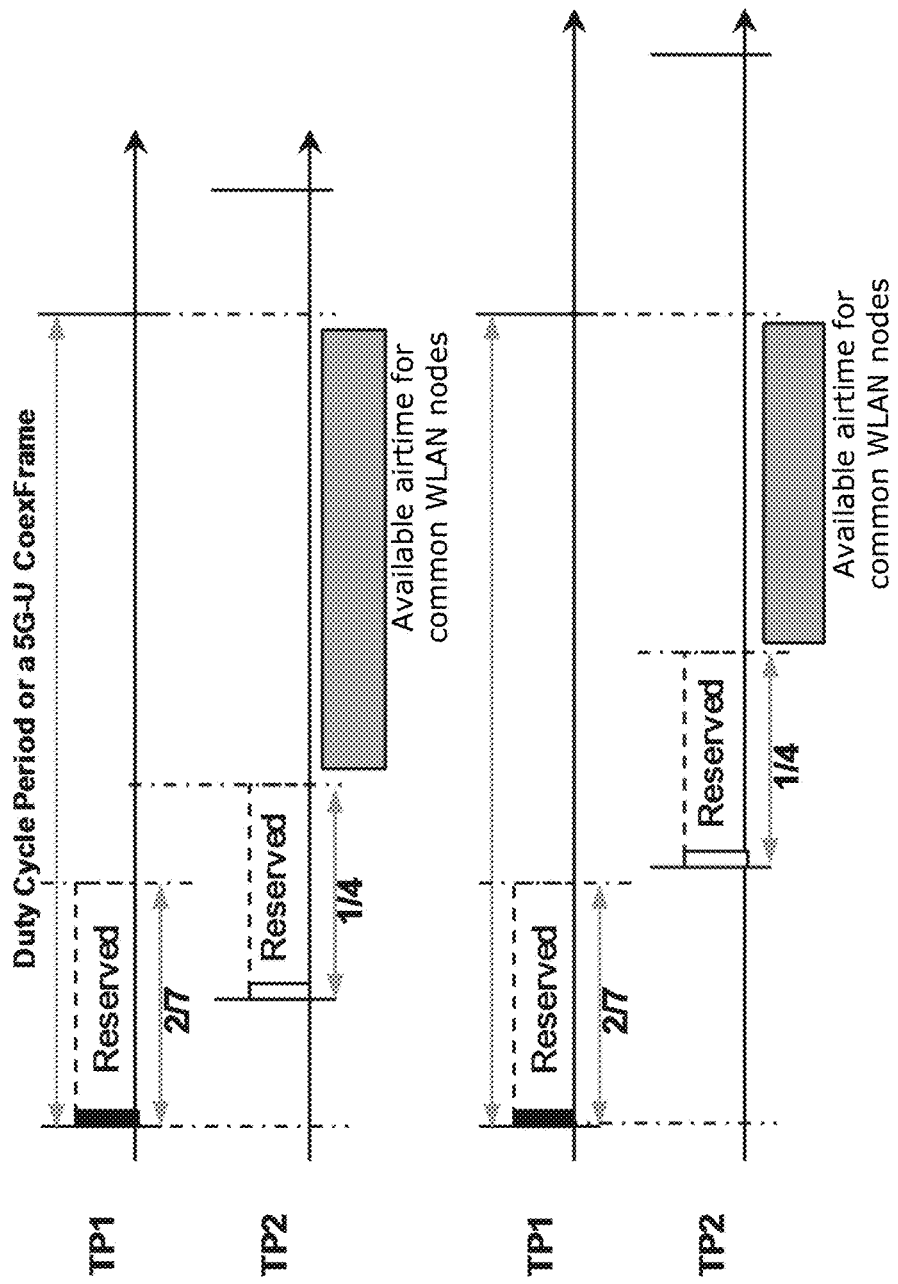
FIG. 10 is a diagram illustrating asynchronous use of a communication medium by TPs having overlapping footprints.

If TP1 and TP2 were considered independently, per conventional approaches, TP1 would have a SAT of 2/(2+5)=2/7; while TP2 would have a SAT of 1/(1+3)=1/4. FIG. 10 illustrates the impact of TP1 and TP2 on WLAN usage of unlicensed medium. In the upper diagram, TP1 and TP2 each independently reserve the medium, blocking out WLAN nodes. In the bottom diagram, TP1 and TP2 also attempt to avoid interfering with each other, thus blocking the medium in sequential periods of time. In both cases, the medium usage may be inefficient and the available airtime for WLAN nodes common to both TP1 and TP2 (i.e., falling in the overlapping area of their footprints) may be significantly less than what would be expected.

Figure 11:
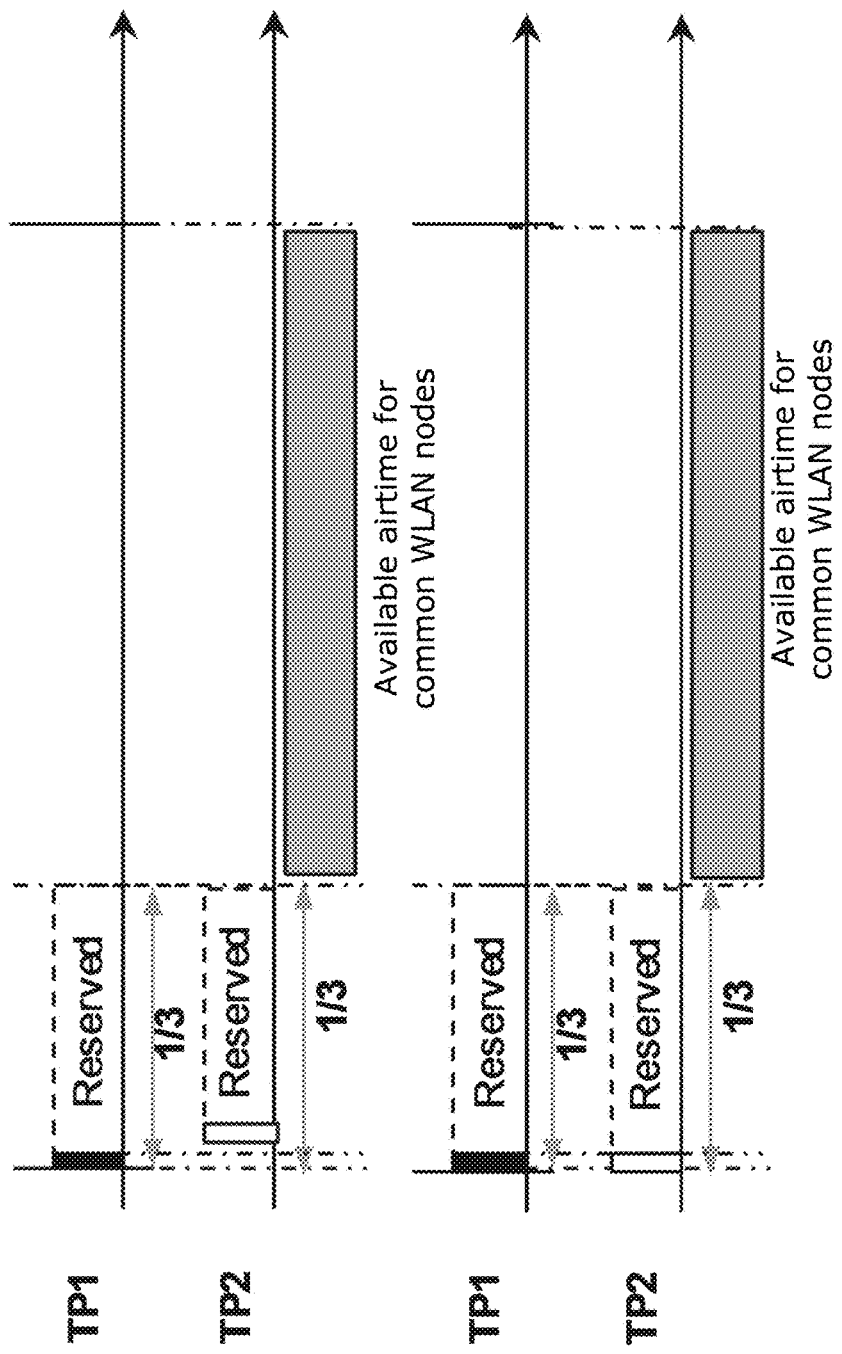
FIG. 11 is a diagram illustrating coordinated use of a communication medium in accordance with examples disclosed herein.

Consider now the same example but with use of RACs, as disclosed herein. When TP1 and TP2 are grouped in the same RAC, the total UE load of the RAC is 2+1=3. Because there are WLAN nodes common to the footprints of both TP1 and TP2, the total number of WLAN nodes falling within the total footprint of the RAC is only 6. Thus, the SAT of the merged RAC is 3/(3+6)=⅓. This is a better SAT value than that of TP1 and TP2 individually. FIG. 11 illustrates the impact of the RAC group on WLAN usage of the unlicensed medium. In the upper diagram, TP1 and TP2 have aligned their medium usage to sequentially reserve the medium. In the lower diagram, TP1 and TP2 jointly reserve the medium. In both cases, usage of the medium may be more efficient than in the conventional approach, and the available airtime for WLAN nodes common to both TP1 and TP2 may be greater than when using the conventional approach.

In various examples, the present disclosure may enable improved throughput and coexistence fairness for LAA. The present disclosure may be suitable for implementation with LTE Advanced (LTE-A), 3GPP standards and/or prospective 5G standards.

Figure 12:
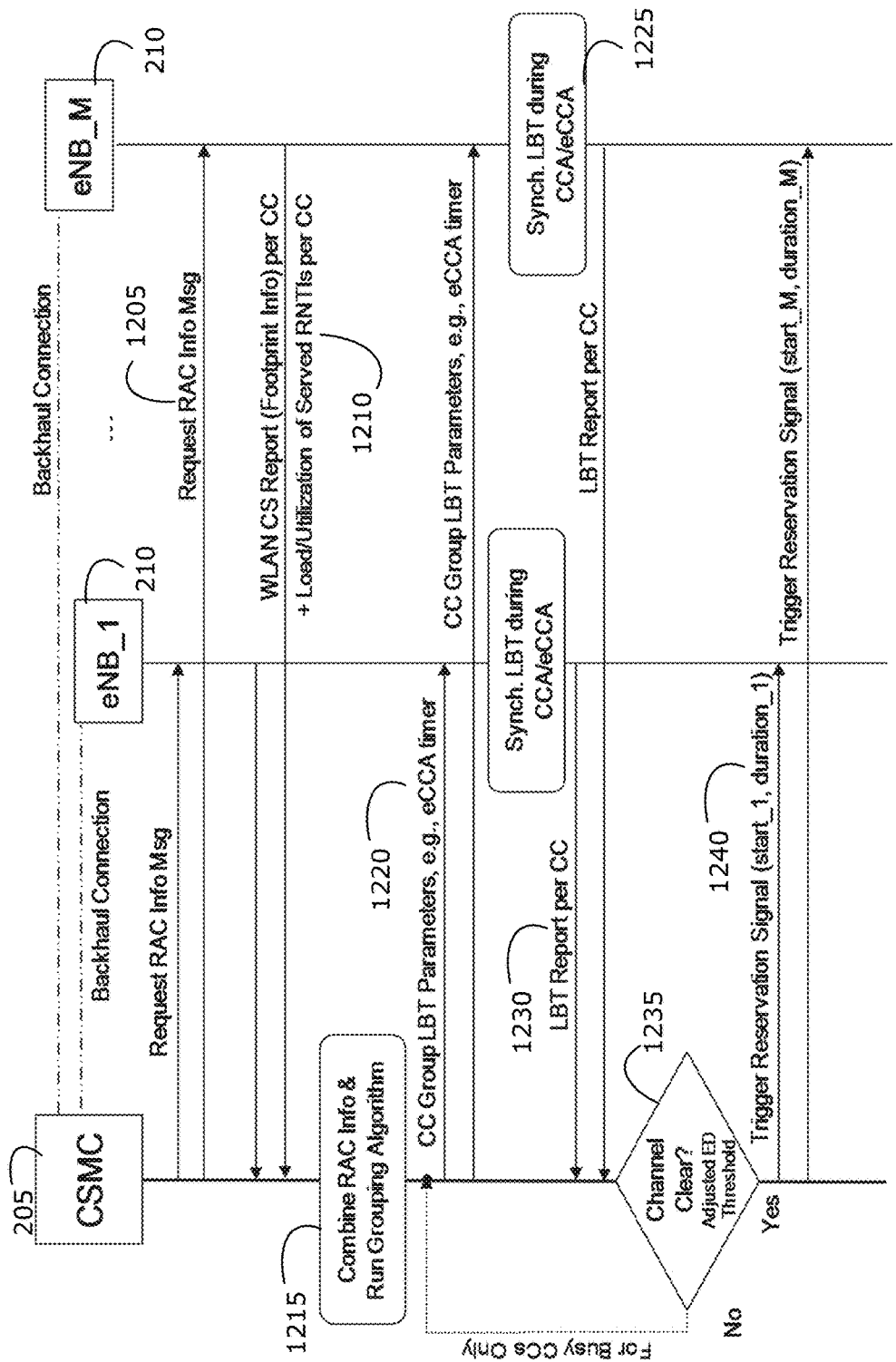
FIG. 12 is a signaling diagram illustrating example signals for implementing examples disclosed herein.

For example, FIG. 12 is a signaling diagram illustrating an example implementation of the disclosed methods using LTE technology. An eNodeB (or other network entity) may be configured to operate as the CSMC 205. The CSMC 205 may be physically connected through backhaul connections to a set of small cell eNBs (acting as TPs 210).

At 1205, the CSMC 205 may transmit a message to its associated TPs requesting information relevant to RACs.

At 1210, each TP 210 may respond by transmitting CS reports on WLAN activities for each of the unlicensed CCs that the associated UEs are configured to use. The CS reports may provide information about the WLAN load (footprint information) for each TP. The CS reports may be considered to be semi-static in that they provide long term (e.g., 100-1000 ms) information. Each TP 210 may also transmit a report on served Radio Network Temporary Identities (RNTIs) and their corresponding long-term traffic load/spectrum utilization for each of the unlicensed CCs it is configured use. The RNTI reports may be semi-static or event-based (e.g., triggered by joining of new UEs). The RNTI reports may provide information about the served load of each TP. In some examples, the TPs 210 may provide such information to the CSMC 205 without requiring a request from the CSMC 205. For example, the TPs 210 may transmit such information upon detection of a trigger (e.g., change in UE load) at the TP 210.

At 1215, the CSMC 205 may use the received information to define one or more RAC groups (e.g., using a suitable RAC grouping algorithm, such as discussed above).

At 1220, the CSMC 205 may transmit the group information to each TP 210. For example, the CSMC 205 may transmit CC group modified LBT parameters, such as which extended clear channel access (eCCA) window to use, to the TPs 210 of each RAC. This information may enable the TPs 210 belonging to a given RAC to perform synchronous LBT, to determine availability of the channel.

At 1225, each TP 210 may synchronize LBT during the specified eCCA, and at 1230 may transmit a LBT report to the CSMC 205.

At 1235, the CSMC 205 may combine the synchronous LBT reports from each TP 210 in a given group to decide on a group access/reservation instant (e.g., with reference to the synchronized cells' subframe boundaries). If there is any RAC with a busy CC (i.e., no access window can be found), the CSMC 205 may set a new eCCA window for that RAC and retransmit the new eCCA to the TPs 210 belonging to that RAC.

After determining the access window for each RAC, at 1240 the CSMC 205 may transmit information to the TPs 210 to cause aligned reservation of the medium by the TPs 210 of each RAC. The reservation signal may indicate the beginning of the common duty cycle for that RAC, and may also indicate the ending and/or duration of the common duty cycle. This information may cause the TPs 210 of a given RAC to jointly transmit reservation signals (e.g., Clear to Send (CTS)-to-self) at a common instant (e.g., beginning of either a regular or a partial subframe) to reserve the channel for a common duration. Alternatively, the reservation signal may cause the TPs 210 of a given RAC to apply a time offset (e.g., less than Point Coordination Function (PCF) Interframe Space (PIFS)) to trigger a sequential transmission of the reservation signals which are adjusted to target the same ending of the common duration.

Figure 13:
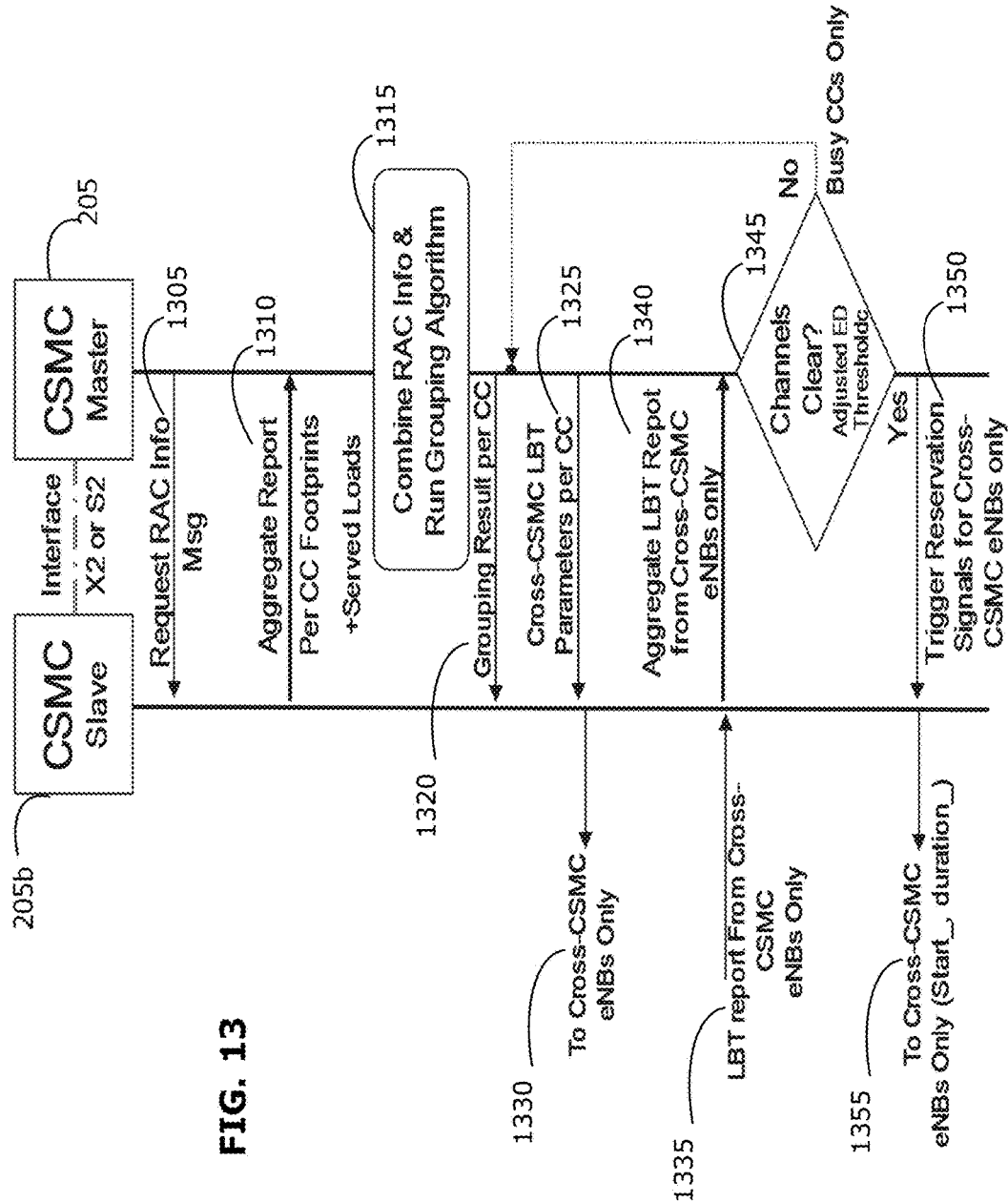
FIG. 13 is a signaling diagram illustrating example signals for implementing cross-server examples disclosed herein.

FIG. 13 is a signaling diagram illustrating an example of cross-CSMC RAC implementation using LTE technology. The master CSMC 205 and slave CSMC 205b may each communicate with their respective associated TPs using the example signaling described above, and may handle their respective local RACs (i.e., RACs that are not cross-CSMC) independently of each other. There may be cross-CSMC signaling (e.g., over a X2 or S2 interface) as illustrated in FIG. 13.

The slave CSMC 205b may receive a higher layer message (not shown) identifying its handling master CSMC 205.

At 1305, the master CSMC 205 may request cross-CSMC RAC information from the slave CSMC 205b. In response, the slave CSMC 205b may, at 1310, transmit an aggregate footprint and served loads report (e.g., relevant only to cross-CSMC RACs) to the master CSMC 205. This report may be transmitted to the master CSMC 205 within a specific time window before the master CSMC 205 performs a RAC grouping algorithm.

At 1315, the master CSMC 205 may use the received information to define one or more cross-CSMC RAC groups (e.g., using a suitable RAC grouping algorithm, such as discussed above).

At 1320, the master CSMC 205 may transmit the grouping result (on a per-CC basis) to the slave CSMC 205b, as well as group LBT parameters (at 1325), and reservation trigger timings. The slave CSMC 205b may, at 1330, transmit this information to its associated TPs that are part of a cross-CSMC RAC.

At 1335, the slave CSMC 205b may report LCT report from its cross-CSMC TPs and, at 1340, forward an aggregate LBT report to the master CSMC 205 providing information about the cross-CSMC TPs associated with the slave CSMC 205b.

At 1345, the master CSMC 205 may decide on group access/reservation instant for the cross-CSMC RAC(s). If there is any RAC with a busy CC (i.e., no access window can be found), the CSMC 205 may set new LBT parameters for that RAC and retransmit this information to the slave CSMC 205b.

After determining the access window for each RAC, at 1350 the master CSMC 205 may reservation signals for cross-CSMC TPs to the slave CSMC 205b, and the slave CSMC 205b may, at 1355, forward this information to the TPs participating in cross-CSMC RACs.

It has been found, through simulations, that throughput gains achieved using examples of the disclosed methods and systems become more significant with higher RAC densities per channel. This may indicate that RAC merging becomes more useful with greater network densification, higher numbers of users, and/or higher utilization of unlicensed channels. This improvement may have insignificant impact on the throughput of impacted WLAN nodes. This may be due to the better coexistence provided by creation of RACs as discussed herein, which may aim to improve SATs while better estimating the fair shares.

It may be noted that the target SAT for a simple (e.g., single-TP) RAC may be computed by normalizing the RAC load by the number of channels used. This may provide a more WLAN-friendly time-domain coexistence and more incentive for RAC merging in the meanwhile. A low complexity RAC merging algorithm, such as discussed herein, may enable one or more of these performance gains in high utilization scenarios without incurring any significant performance losses otherwise.

It has been found in various simulations that, using examples of the disclosed method sand systems, the operating point (e.g., load-based estimation of SAT) can be tuned using a Coexistence Fairness Adjustor to yield the channel to WLAN usage, rendering same or superior WLAN performance while achieving throughput gains ranging from 42% to 118% for its UEs as compared to conventional approaches. Together with this gain, a relative WLAN throughput gain of 4% to 61% was found. Using an energy detection threshold of −72 dBm for sensing WLAN loads, examples of the disclosed methods and systems were found to achieve performance gains compared to conventional approaches. The coexistence throughput gains using 1, 2, and 4 channels were found to be 60%, 61%, and 53%, respectively.

In various examples, the disclosed methods and systems may enable improved frequency reuse, for example a frequency reuse factor of 1, by grouping small cells together in a RAC such that all cells in the RAC can use the same frequencies for transmission. The present disclosure may enable improved frequency reuse in an opportunistic manner.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for managing access of a communication resource in a network, the method comprising:
   receiving, from a plurality of transmission points (TPs), a first set of information indicative of expected usage of a first communication resource by each TP;
   in accordance with the first set of information, defining, based on calculation of a soft airtime (SAT) share, a first set of one or more radio access clusters (RACs) to manage the expected usage of the first communication resource, each RAC including a respective set of one or more TPs of the plurality of TPs, wherein the SAT share is proportional to a served load and is inversely proportional to a coexisting load, the served load representing usage of the first communication resource by a RAC, and the coexisting load representing usage of the first communication resource by one or more coexisting networks in an area of influence impacted by usage of the first communication resource by the RAC;
   wherein a first RAC in the first set of RACs is defined to include a first TP when a merged SAT share, calculated for the first TP grouped together with the first RAC, is greater than or equal to a first SAT share, calculated for the first RAC without the first TP; and
   transmitting timing information to the plurality of TPs to cause each given TP to align timing of usage or reservation of the first communication resource with any other TP belonging to a same RAC to which the given TP belongs, and wherein causing each given TP to align timing further causes each given TP to have a common airtime share of the first communication resource to access the first communication resource simultaneously with any other TP belonging to the same RAC.

2. The method of claim 1, further comprising:
   receiving a second set of information indicative of expected usage of a second communication resource by each TP;
   in accordance with the second set of information, defining a second set of one or more RACs to manage the expected usage of the second communication resource; and
   transmitting the timing information to the plurality of TPs to cause each given TP to align timing of usage or reservation of the second communication resource with any other TP belonging to a same RAC, of the second set of RACs, to which the given TP belongs, and wherein causing each given TP to align timing further causes each given TP to have a common airtime share of the second communication resource to access the second communication resource simultaneously with any other TP belonging to the same RAC of the second set of RACs.

3. The method of claim 1, wherein the received first set of information comprises information about a coexisting load impacted by transmission by each TP and served load of each TP.

4. The method of claim 1, further comprising:
transmitting information to the plurality of TPs to cause each TP belonging to a given RAC to synchronize sensing of availability of the first communication resource with any other TP belonging to the given RAC.

5. The method of claim 4, further comprising:
receiving a third set of information from the plurality of TPs, the third set of information including information about the availability of the first communication resource for access by the TPs;
wherein the timing information transmitted to the plurality of TPs includes information to cause each TP belonging to the given RAC to align timing of usage or reservation of the first communication resource with any other TP belonging to the given RAC within an access window determined in accordance with the third set of information.

6. The method of claim 1, performed by a server associated with the plurality of TPs, wherein the first set of information is received from the plurality of TPs in response to a request for information sent from the server to the TPs.

7. The method of claim 1, performed by a first server associated with the plurality of TPs, further comprising:
receiving, from a second server associated with a different plurality of TPs, aggregated information indicative of expected usage of the first communication resource by the different plurality of TPs; and
in accordance with the aggregated information, transmitting information to the second server and to at least one first TP associated with the first server and belonging to a cross-server RAC to cause the at least one first TP and at least one second TP associated with the second server and belonging to the cross-server RAC to align timing of usage of the first communication resource with each other.

8. The method of claim 7, further comprising:
for the cross-server RAC:
transmitting information to the second server and to the at least one first TP to cause the TPs belonging to the cross-server RAC to synchronize sensing of availability of the first communication resource;
for other RACs:
transmitting information to the one or more TPs belonging to the RAC to cause the one or more TPs belonging to the RAC to synchronize sensing of availability of the first communication resource; and
receiving a second set of information from the plurality of TPs and from the second server, the second set of information including information about the availability of the first communication resource for access by the TPs, including TPs belonging to the cross-server RAC;
wherein the information transmitted to the plurality of TPs and to the second server includes information to cause each TP belonging to each given RAC to align timing of usage or reservation of the first communication resource with any other TP belonging to the given RAC within an access window determined in accordance with the second set of information.

9. A system for managing access of a communication resource in a network, the system comprising a processor configured to execute instructions that cause the system to:
receive, from a plurality of transmission points (TPs) associated with the system, a first set of information indicative of expected usage of a first communication resource by each TP;
in accordance with the first set of information, define, based on calculation of a soft airtime (SAT) share, a first set of one or more radio access clusters (RACs) to manage the expected usage of the first communication resource, each RAC including a respective set of one or more TPs of the plurality of TPs, wherein the SAT share is proportional to a served load and is inversely proportional to a coexisting load, the served load representing usage of the first communication resource by a RAC, and the coexisting load representing usage of the first communication resource by one or more coexisting networks in an area of influence impacted by usage of the first communication resource by the RAC;
wherein a first RAC in the first set of RACs is defined to include a first TP when a merged SAT share, calculated for the first TP grouped together with the first RAC, is greater than or equal to a first SAT share, calculated for the first RAC without the first TP; and
transmit timing information to the plurality of TPs to cause each given TP to align timing of usage or reservation of the first communication resource with any other TP belonging to a same RAC to which the given TP belongs, and wherein causing each given TP to align timing further causes each given TP to have a common airtime share of the first communication resource to access the first communication resource simultaneously with any other TP belonging to the same RAC.

10. The system of claim 9, wherein the processor is configured to execute instructions that further cause the system to:
receive a second set of information indicative of expected usage of a second communication resource by each TP;
in accordance with the second set of information, define a second set of one or more RACs to manage the expected usage of the second communication resource; and
transmit the timing information to the plurality of TPs to cause each given TP to align timing of usage or reservation of the second communication resource with any other TP belonging to a same RAC, of the second set of RACs, to which the given TP belongs, and wherein causing each given TP to align timing further causes each given TP to have a common airtime share of the second communication resource to access the second communication resource simultaneously with any other TP belonging to the same RAC of the second set of RACs.

11. The system of claim 9, wherein the received first set of information comprises information about a coexisting load impacted by transmission by each TP and served load of each TP.

12. The system of claim 9, wherein the processor is configured to execute instructions that further cause the system to:
transmit information to the plurality of TPs to cause each TP belonging to a given RAC to synchronize sensing of availability of the first communication resource with any other TP belonging to the given RAC.

13. The system of claim 12, wherein the processor is configured to execute instructions that further cause the system to:

receive a third set of information from the plurality of TPs, the third set of information including information about the availability of the first communication resource for access by the TPs;

wherein the timing information transmitted to the plurality of TPs includes information to cause each TP belonging to the given RAC to align timing of usage or reservation of the first communication resource with any other TP belonging to the given RAC within an access window determined in accordance with the second set of information.

14. The system of claim 9, wherein the first set of information is received from the plurality of TPs in response to a request for information sent from the system to the TPs.

15. The system of claim 9, wherein the system is a first system associated with the plurality of TPs, wherein the processor is configured to execute instructions that further cause the system to:

receive, from a second system associated with a different plurality of TPs, aggregated information indicative of expected usage of a first communication resource by the different plurality of TPs; and in accordance with the aggregated information, transmit information to the second system and to at least one first TP associated with the first system and belonging to a cross-server RAC to cause the at least one first TP and at least one second TP associated with the second system and belonging to the cross-server RAC to align timing of usage of the first communication resource with each other.

16. The system of claim 15, wherein the processor is configured to execute instructions that further cause the system to:

for the cross-server RAC:
transmit information to the second server and to the at least one first TP to cause the TPs belonging to the cross-server RAC to synchronize sensing of availability of the first communication resource;

for other RACs:
transmit information to the one or more TPs belonging to the RAC to cause the one or more TPs belonging to the RAC to synchronize sensing of availability of the first communication resource; and receive a second set of information from the plurality of TPs and from the second server, the second set of information including information about the availability of the first communication resource for access by the TPs, including TPs belonging to the cross-server RAC;

wherein the information transmitted to the plurality of TPs and to the second server includes information to cause each TP belonging to each given RAC to align timing of usage or reservation of the first communication resource with any other TP belonging to the given RAC within an access window determined in accordance with the second set of information.

17. A method, by a transmission point (TP), for accessing a communication resource in a network, the method comprising:

transmitting, to a central server, a first set of information indicative of expected usage of a first communication resource by the TP, the first set of information including information about a first coexisting load, the first coexisting load representing usage of the first communication resource by one or more coexisting networks in an area of influence impacted by usage of the first communication resource by the TP, and also including information about a first served load of the TP, the first served load representing usage of the first communication resource by the TP;

receiving information from the central server about a radio access cluster (RAC) to which the TP belongs, the information including timing information for accessing the first communication resource, the timing information causing the TP to align timing of usage or reservation of the first communication resource with any other TP belonging to the RAC, and the timing information further causing the TP to have a common airtime share of the first communication resource to access the first communication resource simultaneously with any other TP belonging to the RAC;

receiving information from the central server to cause the TP to perform synchronized sensing of availability of the first communication resource with other TPs belonging to the RAC; and accessing or reserving the first communication resource in accordance with the timing information;

wherein the RAC is defined, by the central server, based on calculation of a soft airtime (SAT) share, wherein the SAT share is proportional to a served load and is inversely proportional to a coexisting load, the served load representing usage of the first communication resource by the RAC, and the coexisting load representing usage of the first communication resource by one or more coexisting networks in an area of influence impacted by usage of the first communication resource by the RAC; and wherein the RAC is defined, by the central server, to include the TP when a merged SAT share, calculated for the TP grouped together with the RAC, is greater than or equal to a first SAT share, calculated for the RAC without the TP.

18. The method of claim 17, further comprising:

transmitting, to the central server, a second set of information indicative of expected usage of a second communication resource by the TP, the second set of information including information about a second coexisting load, the second coexisting load representing usage of the second communication resource by one or more coexisting networks in an area of influence impacted by usage of the second communication resource by the TP, and also including information about a second served load of the TP, the second served load representing usage of the second communication resource by the TP;

receiving information from the central server about a different RAC to which the TP belongs, the different RAC being used for the second communication resource, the information including timing information for accessing the second communication resource, the timing information causing the TP to align timing of usage or reservation of the second communication resource with any other TP belonging to the different RAC, and causing the TP to have a common airtime share of the second communication resource to access the second communication resource simultaneously with any other TP belonging to the different RAC;

receiving information from the central server to cause the TP to perform synchronized sensing of availability of the second communication resource with other TPs belonging to the different RAC; and accessing or reserving the second communication resource in accordance with the timing information.

19. The method of claim 17, further comprising:
transmitting, to the central server, a third set of information, the third set of information including information about the availability of the first communication resource for access by the TP;
wherein the timing information received from the central server includes information to cause the TP to align timing of usage or reservation of the first communication resource with any other TP belonging to the RAC within an access window.

20. The method of claim 17, wherein the first set of information is transmitted in response to a request for information sent from the central server to the TP.

21. The method of claim 17, wherein the first set of information is transmitted in response to detection of a trigger condition at the TP.

22. The method of claim 1 wherein each given TP is caused to align timing of usage or reservation of the first communication resource for each upcoming frame.

* * * * *